March 18, 1941.  A. BIESEMEYER  2,235,602
CANVAS PROTECTOR FOR HARVESTERS
Filed June 5, 1939
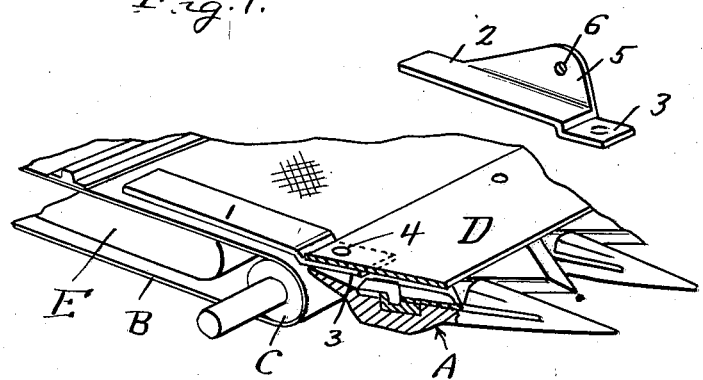
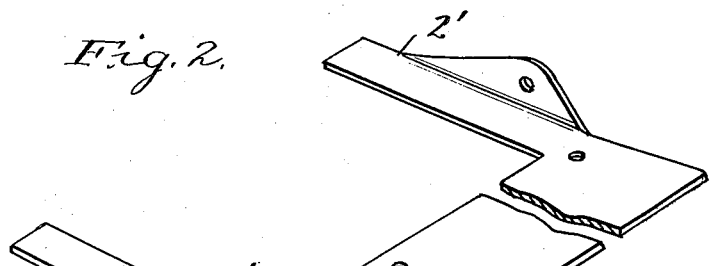
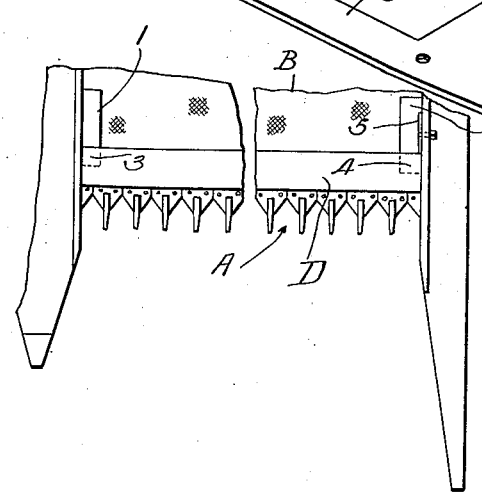
Inventor
August Biesemeyer
By Clarence A. O'Brien
and Hyman Berman
Attorneys Patented Mar. 18, 1941

2,235,602

UNITED STATES PATENT OFFICE 2,235,602

CANVAS PROTECTOR FOR HARVESTERS

August Biesemeyer, New Franklin, Mo.

Application June 5, 1939, Serial No. 277,524

1 Claim. (Cl. 56—153)

This invention relates to means for protecting the canvas belts of harvesters by providing extension plates at the ends of the plate which extends in rear of the cutter bar, these extension plates extending over the canvas adjacent the edges thereof so as to prevent the material passing from the plate onto the canvas belt from engaging the belt where it passes over the front roller.

The invention is shown in the accompanying drawing in which:

Figure 1 shows a fragmentary portion of a harvesting machine with the protected parts in section and showing one form of the invention.

Figure 2 is another form of the invention.

Figure 3 is a fragmentary top plan view of a harvesting machine showing the invention in use thereon.

In these views, the letter A indicates generally the cutting assembly of a harvester, the letter B indicates the canvas belt passing over front and rear rollers, the front roller being shown at C, the material cut by the cutting assembly passing over an elongated metal plate D onto the belt and the belt traveling over a track member E. I have found that the butts of grain cut by the machine will get in the space between the front roller and the front end of the track member E and this will tear and damage the belt and in order to prevent this I provide the extension plates 1 and 2 which have downwardly offset front end portions 3 which pass under the rear edge of the plate D and are fastened thereto by rivets or bolts 4, the major portions of the plates 1 and 2 extending over the front portion of the belt at the side edges thereof as shown in Figures 1 and 3. The plate 2 is provided with an upstanding part 5 having a hole 6 therein for fastening to a frame part of the machine. Instead of forming the plates 1 and 2 separately and attaching them to the plate D, I may form the plate D' with the members 2' and 3' formed integrally therewith as shown in Figure 2.

These parts extending over the belt as shown will prevent the cut material from collecting in the space between the front belt and the front end of the track member E and thus prevent damage to the belt.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a harvesting machine including a cutting assembly, a conveyor belt, a front roller for the belt arranged in rear of the cutting assembly and a plate for delivering the material from the cutting assembly on to the belt; plates having their front ends connected with the ends of the first-mentioned plate and said second-mentioned plates extending rearwardly over edge portions of the belt where the belt passes rearwardly from the roller, said second-mentioned plates preventing the material cut by the harvesting machine from contacting said edge portions of the belt, one of said plates having an upstanding portion at its outer edge and having a hole therein for receiving fastening means for connecting the plate to a part of the frame of the machine.

AUGUST BIESEMEYER.